July 21, 1925.
A. M. MORRISON
EMERGENCY VALVE
Filed Sept. 24, 1924
1,546,602
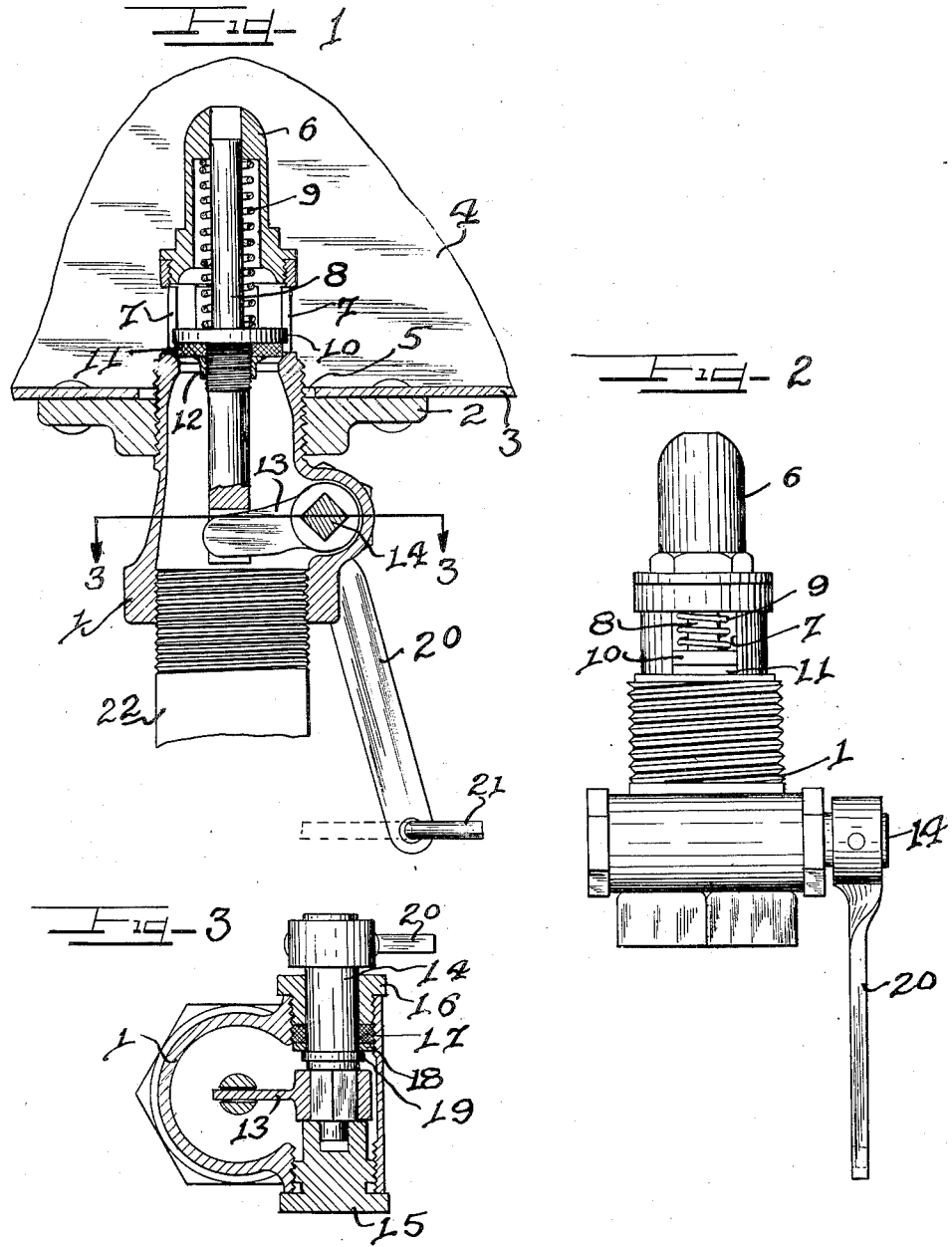
Inventor
Andrew M. Morrison
by 
Attys.

Patented July 21, 1925.

1,546,602

UNITED STATES PATENT OFFICE.

ANDREW M. MORRISON, OF DUBUQUE, IOWA.

EMERGENCY VALVE.

Application filed September 24, 1924. Serial No. 739,575.

*To all whom it may concern:*

Be it known that I, ANDREW M. MORRISON, a citizen of the United States, and a resident of the city of Dubuque, in the county of Dubuque and State of Iowa, have invented certain new and useful Improvements in an Emergency Valve; and I hereby declare that the following is a full, clear, and exact description of the same, reference being had to the accompanying drawings, and to the numerals of reference marked thereon, which form a part of this specification.

This invention relates to emergency valves and more particularly to those used in connection with oil filling lines. In oil filling systems it is desirable to have a valve situated in the outlet adjacent the supply compartment as a preventive against loss of gasoline or oil, in the event of damage to the faucets or piping. This is particularly desirable in the case of oil trucks where the piping and faucets are subject to rough usage and damage thereto might result in a serious loss of oil.

It is therefore an object of this invention to provide a valve which may be inserted in the outlet of the supply compartment which may be closed from a plurality of remote positions as from the driver's seat or the bucket box.

It is further an object of this invention to provide a valve for this purpose which may be manufactured so that it is adapted to conform to the various requirements as to right hand or left hand control as found necessary upon installation. It is also an important object of this invention to provide a valve of this class in which the seat comprises a composition disc secured between a collar integral with the stem and a nut threaded thereto.

It is also an object of this invention to provide in a device of this kind a means for changing the control from the right-hand to the left-hand side of the valve.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevational view partly in section of the device installed in a supply compartment outlet.

Figure 2 is a side view of the device.

Figure 3 is a cross section of the device, along the line 3—3 of Figure 1.

As shown on the drawings:

The numeral 1 refers to a valve casing which is threaded in a flange member 2, the latter being riveted or suitably secured in a bottom 3 of a supply compartment 4. The bottom 3 is apertured at 5 to receive the casing 1; an end of which extends into the compartment 4. The end of the casing 1 extending into the compartment 4 is internally threaded to receive a cap member 6 and contains slots 7 in the sides thereof for receiving oil from the compartment into said casing. The cap member 6 is apertured at the top thereof to form a guide for the upper end of a valve stem 8. The cap member 6 is counterbored at the bottom to receive a spring 9 which surrounds the valve stem 8 and bears downwardly upon a collar 10 integral with said stem. Secured beneath the collar 10 on the stem 8 is a disc member 11 which is preferably of composition material. The disc 11 is threaded to the stem 8 and is locked thereon beneath the collar 10 by a lock nut 12. The lower end of the valve stem 8 is forked to receive the end of an arm 13 which is mounted against rotation on a shaft 14 mounted transversely in the lower end of the casing 1. The shaft 14 is supported within the casing 1 by bearing members 15 and 16. The member 15 threadedly engages in the casing 1 and is bored a short distance on its inner end to receive one end of the shaft 14. The member 16 oppositely disposed to the member 15 is apertured to receive the other end of the shaft 14 and is also threaded to engage in the casing 1. A packing ring 17 and a washer 18 pressed by the member 16 against a collar 19 integral with the shaft 14 prevents the oil leaking through said member along said shaft 14. An arm 20 is mounted against rotation on the outer end of the shaft 14 and is actuated by a suitable rod 21 connected to a suitable lever (not shown) located in any desired position from which it is desired to actuate the valve. Threaded to the lower end of the valve casing is an outlet pipe 22.

In the operation of the valve which is located in the outlet to the supply compartment 4, the lever (not shown) connected to the rod 21 in a remote position such as the bucket box is actuated to raise the valve disc 11 from its seat. This allows oil to flow from the compartment 4 through the valve casing 1 into the outlet pipe 22 to the faucets in the bucket box. If something happens to the piping or the faucets the lever (not shown) in the bucket box may be released and the valve automatically closed by the action of the spring 9. The rod 21 may also be connected so that it may be released by a lever on the driver's seat so that the valve may be controlled therefrom also in the event that any damage to the faucets or piping is noticed by a person in said seat.

It is frequently necessary in order to accommodate various positions in the outlet lines relative to the operating positions that some of the valves be actuated from the right-hand as well as the left hand or vice-versa. It will be seen that the supporting members 15 and 16 and the position of the shaft 14 and the arm 20 may be changed so that said arm 20 is on the left-hand side of the casing instead of the right-hand side, as shown in the drawings.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

A valve for the purpose described comprising an elongated hollow casing, an exterior threaded portion intermediate the ends of said casing, a valve seat within said casing, said casing having slots in the side thereof above said seat, a cap member closing one end of said casing, said cap having an aperture, a valve stem slidable in said casing and aperture, a valve disc secured on said stem and adapted to fit said seat, a spring surrounding said stem one end of said spring engaging said cap, the other end abutting said disc, the other end of said casing being connected to a pipe, said casing being provided with a pair of transverse apertures for supporting a means for actuating said valve stem and interchangeable bearing members mounted in said apertures.

In testimony whereof I have hereunto subscribed my name in the presence of two subscribing witnesses.

ANDREW M. MORRISON.

Witnesses:
J. A. WALKER,
A. J. KASEL.